United States Patent [19]

Peltonen

[11] Patent Number: 4,983,201
[45] Date of Patent: Jan. 8, 1991

[54] METHOD AND APPARATUS IN A GLASS SHEET BENDING FURNACE FOR PREVENTING THE DEFLECTION OF MOULD WAGON BEARING RAILS

[75] Inventor: Esko J. Peltonen, Kangasala, Finland

[73] Assignee: Tamglass Oy, Tampere, Finland

[21] Appl. No.: 436,000

[22] Filed: Nov. 14, 1989

[30] Foreign Application Priority Data

Nov. 24, 1988 [FI] Finland ............... 885449

[51] Int. Cl.⁵ .............. C03B 23/025; C03B 35/14
[52] U.S. Cl. .......................... 65/104; 65/107; 65/273; 65/355
[58] Field of Search ............... 65/104, 107, 119, 273, 65/285, 355

[56] References Cited

U.S. PATENT DOCUMENTS

| | | | |
|---|---|---|---|
| 3,248,517 | 4/1966 | Vranken | 65/107 |
| 3,431,095 | 3/1969 | Ross | 65/107 |
| 3,884,667 | 5/1975 | Schraven | 65/119 |
| 4,497,645 | 2/1985 | Peltonen | 65/107 |
| 4,755,204 | 7/1988 | Boardman et al. | 65/107 |

Primary Examiner—Joye L. Woodard
Attorney, Agent, or Firm—Burns, Doane, Swecker & Mathis

[57] ABSTRACT

A method and an apparatus in a glass sheet bending furnace are disclosed for preventing the deflection of a mould wagon bearing rail as the mould wagon is carried along a conveyor track made up of rollers on which the bearing rails rest, wherein the furnace includes a top array of successive heating sections and a bottom array of successive cooling sections. Deflection of the bearing rails is prevented by blasting cooling air to the top surfaces of the bearing rails in a cooling section of the furnace.

6 Claims, 3 Drawing Sheets

METHOD AND APPARATUS IN A GLASS SHEET BENDING FURNACE FOR PREVENTING THE DEFLECTION OF MOULD WAGON BEARING RAILS

BACKGROUND OF THE INVENTION

1. Field of the Invention

The present invention relates to a method and an apparatus in a glass sheet bending furnace for preventing the deflection of a mould wagon bearing rail as the mould wagon is carried along a conveyor track, consisting of rollers upon which the bearing rails are resting, the furnace including a top array of successive heating sections and a bottom array of successive cooling sections.

2. Description of the Prior Art

A problem encountered in a glass sheet bending furnace is the considerable deflection of the bearing rails mounted alongside a mould wagon during a cooling cycle. The resulting deflection remains in the rails even as the wagon is advancing along the top track from one heating section to the next. The deflection of bearing rails results in a shaking or "jolting" movement of the wagon which is why especially rather large glass sheets are easily broken even before a bending section on the top track.

The deflection of wagon bearing rails occurs on the bottom track as a result of temperature differences. First of all, the hot bearing rails deliver heat through their bottom surfaces to conveyor track supporting rollers. Secondly, the hot glass and mould deliver radiation heat to the top surface of a bearing rail.

SUMMARY OF THE INVENTION

It has been realized in this invention that this deflection of bearing rails as a result of temperature differences can be prevented by blowing cooling air to the top surface of bearing rails on the bottom track.

The characterizing features of the invention are set forth in the annexed claims.

BRIEF DESCRIPTION OF THE DRAWINGS

The invention will now be described with reference made to the accompanying drawings, in which

FIG. 4 shows schematically the deflection of a hot bearing rail 5a as it delivers heat to cooler supporting rollers 8a.

DESCRIPTION OF THE PREFERRED EMBODIMENT

Figure 1:
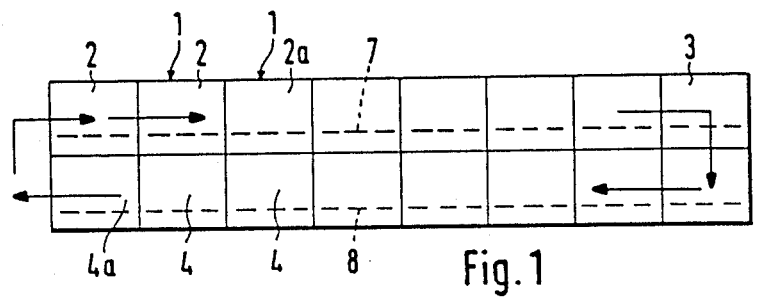
FIG. 1 shows schematically a bending furnace in a side view.

The bending furnace shown in FIG. 1 includes a top array of successive heating sections 2 and a bottom array of successive cooling sections 4. The arrows indicate the traveling path of glass sheets along a top conveyor track 7 and a bottom conveyor track 8. The first heating sections 2 are so-called preheating sections, followed by the actual heating sections and then by one or two bending sections. At least the preheating sections 2 along with their cooling sections 4 underneath consist of section slices 1 as shown in FIG. 2.

Figure 3:
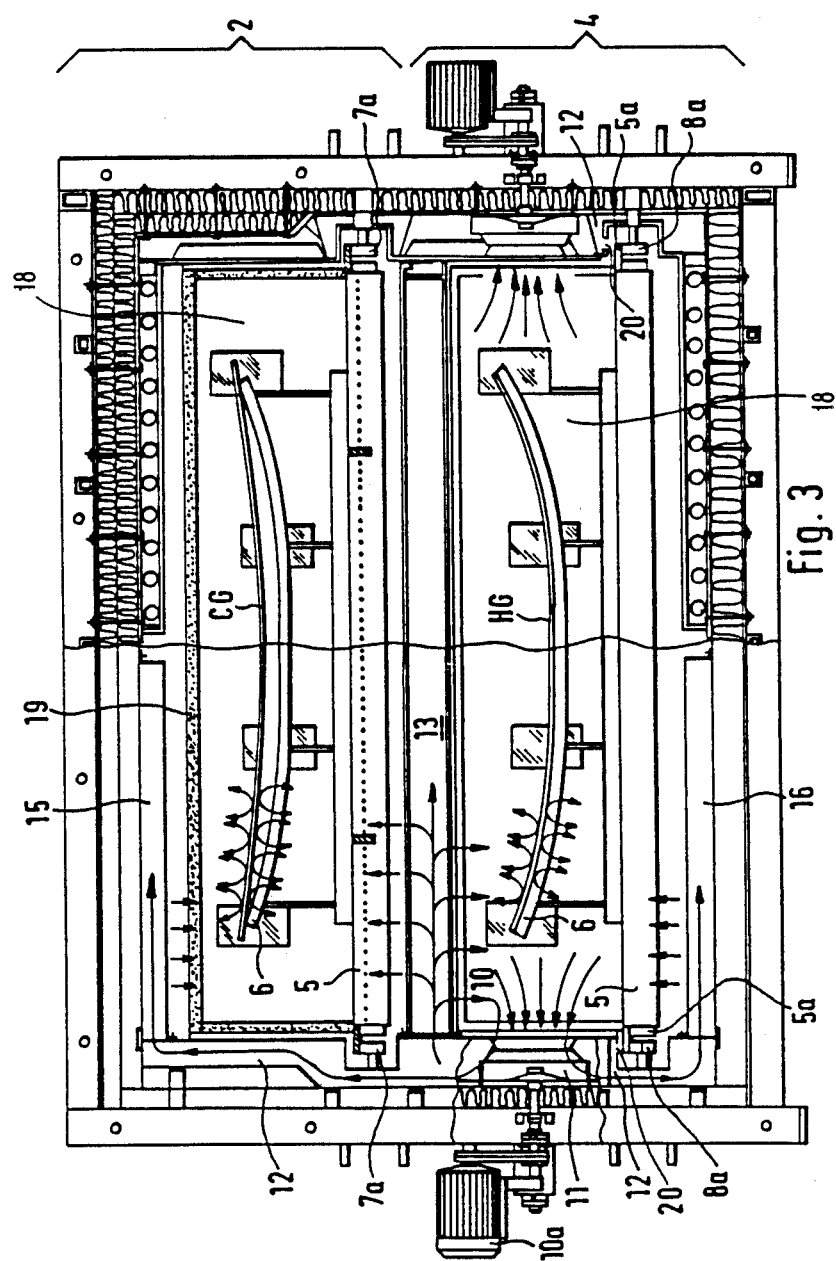
FIG. 3 shows a bending furnace in a cross-section.

The glass sheets are placed on top of bending moulds 6 supported by carrier wagons 5 or mould wagons shown in FIG. 3. The rails 5a of wagons 5 are supported upon the top track rollers 7a and the bottom track rollers 8a respectively. The successive wagons 5 are advanced on the top conveyor track 7 from one heating section 2 to the next. The same way, wagons 5 are advanced on the bottom conveyor track 8 from one cooling section 4 to the next. The transfer can be effected the same way as disclosed in U.S. Pat. No. 4,497,645.

The heat transfer between successive sections 4 and 2 is intensified by means of an arrangement described hereinbelow.

Figure 2:
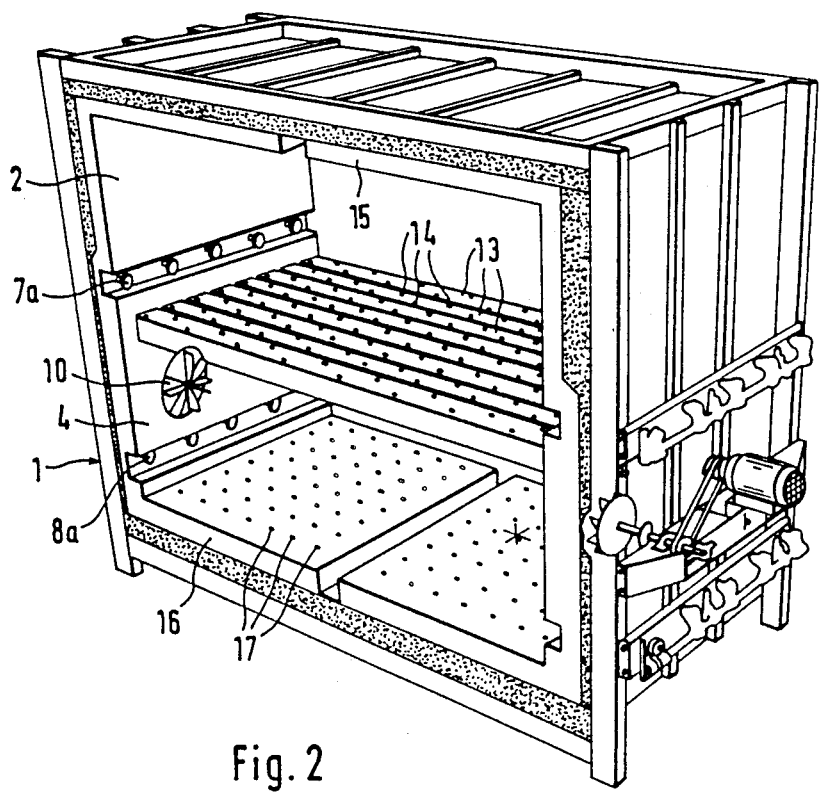
FIG. 2 is a perspective view of a slice of one bending furnace section, comprising a top heating section and a bottom cooling section.

As shown in FIGS. 2 and 3, the ceiling and floor of heating section 2 as well as those of cooling section 4 are fitted with blast air supply boxes 13, 15, 16, provided with blast orifices 14, 17 which are distributed substantially over the surface area of the sections. Both side walls of cooling sections 4 are fitted with fans 11 whose suction inlets 10 open into the cooling section. The pressure sides of fans 11 are connected by means of air passages 12 to said supply boxes 13, 15, 16.

The fans 11 are used for the continuous suction of air out of cooling section 4, whereby a bent hot glass sheet HG delivers heat to this air upon cooling. The blast orifices 14, 17 of supply boxes 13, 15, 16 serve to discharge air as substantially vertical jets to the top and bottom surface of a glass sheet CG as well as to the top and bottom surface of a glass sheet HG. The air coming into section 2 finds its way back into section 4 through the gaps between box beams 13.

In order to maintain thermal equilibrium, some hot air is discharged from at least one section 2 outside the furnace and, respectively, some cold replacement air is supplied into at least one section 4, the latter being distributed in the lengthwise direction of the furnace from one section 4 to another section 4. Preferably, the cold replacement air is supplied into section 4a and hot air is withdrawn from section 2a (FIG. 1).

The above-described heat transfer system is typically effected e.g. in the first three heating sections 2 (depending on the furnace capacity) and, correspondingly, in as many last cooling sections 4.

The end walls 18 of wagons 5 provide partitions between successive sections 2, 2 or 4, 4 whenever the wagons 5 are stopped inside the sections. At the junctions between successive heating sections 2 there is provided a resilient sealing means 19 which comes in contact with end walls 18 of the wagons and which is e.g. a brush made of artificial fibers/hair and which provides a barrier for air flows between successive sections. This makes it easier to maintain the temperature differences between successive sections 2. On the other hand, the temperature differences between superimposed sections should be equalized as effectively as possible.

Figure 4:
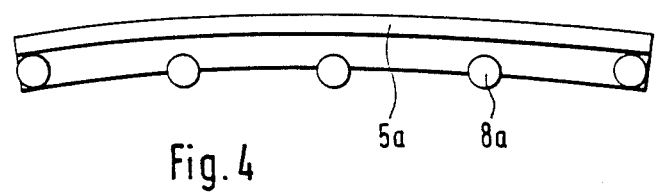

FIG. 3 illustrates the flat rails 5a running alongside wagons 5 and carrying said wagons 5 so as to rest them upon conveyor rollers 7a. On the bottom track 8, the advancing direction of wagons 5 is from hot to cold. Thus, the hot rails 5a deliver heat at their bottom surfaces to rollers 8a and take up radiation heat at their top surfaces from hot glass sheet HG and its mould 6. This results in the deflection of rail 5a, as shown in FIG. 4. Rail 5a retains its deflected condition even after the wagon has advanced onto top track 7 for bending of another glass sheet. The deflected rail 5a results in a shaking or "jolting" movement of the wagon which is why especially rather large glasses are easily broken even before reaching a bending section 3 (FIG. 1) on the top track.

Figure 5:
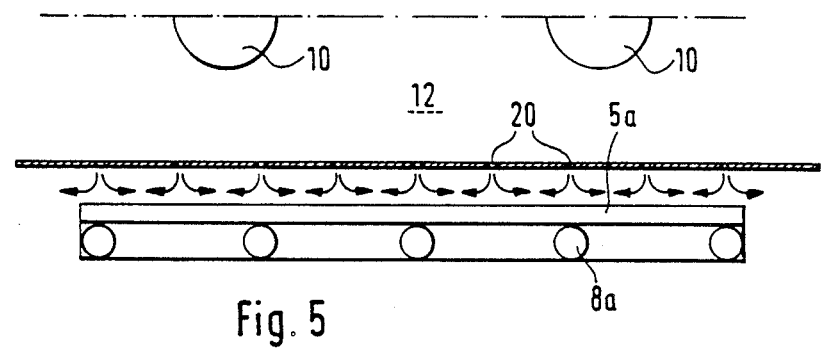
FIG. 5 shows a condition in which the deflection shown in FIG. 4 has been straightened by means of a cooling blast of the invention.

As shown in FIGS. 3 and 5, the air passages 12 alongside a cooling section 4 are provided with drilled holes 20 for blasting cooling air to the top surface of rails 5a. The cooling air jets equalize effectively the resulting temperature differences and rail 5a remains straight. The necessary size for blasting holes 20 can be experimentally determined. If desired, the holes 20 can also be made adjustable. The blasting holes 20 can be made in one or a plurality of successive cooling sections 4.

What is claimed is:

1. A method for resisting the deflection of mould wagon bearing rails in a glass sheet bending furnace which includes a top array of successive heating sections for heating glass sheets and a bottom array of successive cooling sections for cooling the glass sheets, said method comprising:
   conveying a mould wagon which includes bearing rails and which carries a glass sheet through said heating and cooling sections along a conveyor track on which said bearing rails rest; and
   blasting cooling air against top surfaces of said bearing rails of said mould wagon in at least one of said cooling sections to thereby resist deflection of said bearing rails.

2. A method as claimed in claim 1, wherein said cooling air is sucked from said at least one cooling section by means of a fan, and is passed through an array of air passages to blasting openings above said conveyor track.

3. A glass sheet bending furnace, comprising:
   a top array of successive heating sections for heating glass sheets in said furnace;
   a bottom array of successive cooling sections for cooling said glass sheets in said furnace;
   a mould wagon for carrying one of said glass sheets, said mould wagon including bearing rails;
   a conveyor track which conveys said mould wagon through said heating and cooling sections and on which said bearing rails rest; and
   means for blasting cooling air against top surfaces of said bearing rails in at least one of said cooling sections for resisting deflection of said bearing rails.

4. A glass sheet bending furnace as claimed in claim 3, wherein said means for blasting cooling air includes a fan having a suction inlet which opens within said at least one cooling section.

5. A glass sheet bending furnace as claimed in claim 3, wherein said means for blasting cooling air includes blasting openings located in at least one wall of said at least one cooling section above said conveyor track.

6. A glass sheet bending furnace as claimed in claim 5, wherein said blasting openings are located in two opposite walls of said at least one cooling section.

* * * * *